United States Patent [19]

Harrell et al.

[11] Patent Number: 4,942,581
[45] Date of Patent: Jul. 17, 1990

[54] OPTICAL PHASE DETECTION AND CONTROL SYSTEM

[75] Inventors: Sarah R. Harrell, Palm Beach; John D. Rowland, Lake Park, both of Fla.

[73] Assignee: United Technologies Corp., Hartford, Conn.

[21] Appl. No.: 303,628

[22] Filed: Jan. 27, 1989

[51] Int. Cl.$^5$ ............................................... H01S 3/10
[52] U.S. Cl. .......................................................... 372/9
[58] Field of Search ............................................. 372/9

*Primary Examiner*—Léon Scott, Jr.
*Attorney, Agent, or Firm*—Perman & Green

[57] ABSTRACT

A system is described for determining the phase relationship between two coherent beams and, if the beams are not in phase, providing a correction signal to bring them into phase. The system combines the beams to create an interference fringe pattern, the pattern exhibiting, if the beams are in phase, a central peak (zero order) irradiance fringe bounded on either side by lesser peak (higher order) irradiance fringes. The fringe pattern responds to a change in the relative phase of the beams by the fringes walking to the left or right under the stationary modulation envelope depending upon the direction of phase change between the beams. A pair of side fringe detectors are positioned to detect the lesser peak irradiance fringes but not the central peak irradiance fringe and to provide signals indicative of the power in each lesser peak irradiance fringe. A processor responsive to those signals, provides a correction output when the signals indicate unequal powers. A preferred embodiment OPD correction system is described and additionally includes a center fringe detector for detecting the central peak irradiance fringe as well as detectors for the lesser peak irradiance fringes. The central fringe output signal is applied to the processor which, in combination with the lesser peak irradiance fringe signals, is used by the processor to derive the correction output.

10 Claims, 4 Drawing Sheets

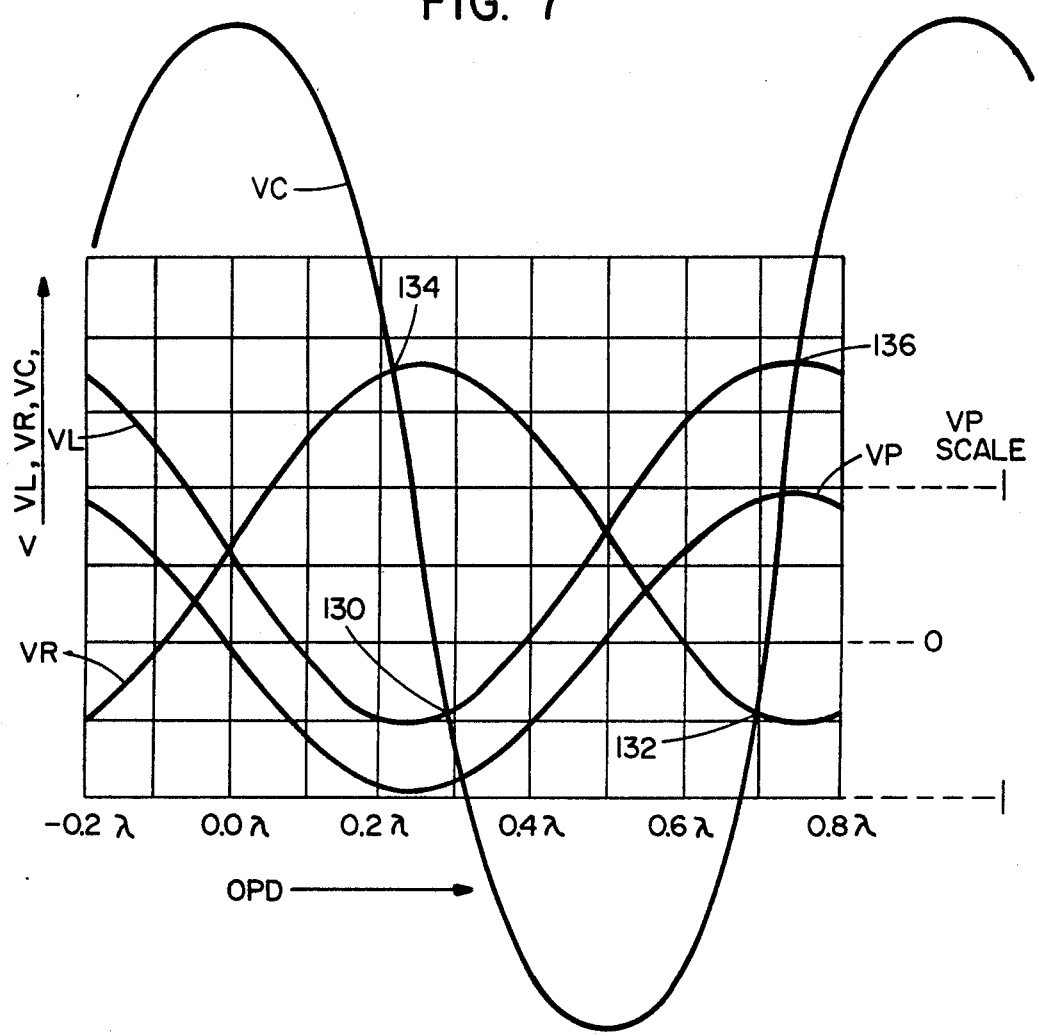

OPTICAL PHASE DETECTION AND CONTROL SYSTEM

FIELD OF THE INVENTION

This invention relates to coherent optical systems and, more particularly, to an apparatus for detecting the phase difference between two distinct coherent optical beams and correcting the phase difference to achieve coherence.

DESCRIPTION OF THE PRIOR ART

In a variety of optical systems, it is necessary to assure that two or more separate optical signals are in phase. More particularly, it is necessary that their optical path difference (OPD) be made equal to within a fraction of a wavelength to assure proper coherence. The need for such coherence control is found in phased array laser transmitters/receivers and certain advanced telescopes. For instance, to realize the full potential of a phased array laser transmitter, the wavefronts emerging from its different telescopes should all lie on a common sphere, centered at the target. Thus, the individual laser beams need to be focused to the same range and pointed to a common point. The optical path lengths through the separate telescopes must be controlled so that the beams will add coherently at the receiver or the target.

While means for controlling the OPD of a coherent beam are known in the art, a cost-effective method for providing signals to operate the phase control apparatus has not been so clearly evident.

The phase control mechanism may be a mirror mounted on a piezo-electric or other electro-active substrate which can be moved ("pistoned") in accordance with an applied signal voltage. One system for deriving a control signal for such a mirror actuator is described by R. R. Butts et al in "A Concept For A Phased Array Laser Transmitter", Proceedings of SPIE, Volume 440, pgs. 118–125. Butts et al describe a system wherein samples from two beams under consideration are projected on a segmented detector array, the beams interacting to create an interference pattern. This interference pattern is the Fraunhofer diffraction pattern of the two beam samples (i.e. "double slit"). It comprises a series of bright and dark fringes modulated by a low frequency envelope. The detector array comprises a substantial number of individual photo-detector segments, or pixels, which respond to the light and dark fringes by providing an electrical output signal proportional to the amount of light incident upon each pixel. Those signals are detected and the system then searches for the maximum intensity of the pattern. The maximum is used as the center of a subsequent pattern search; the data from the pattern search is processed; and a control signal is generated to modify the OPD such that the power levels are symmetrical about this central maximum. When this is achieved, the two optical beams are said to be in phase.

In a paper entitled "Analysis of Phase Measurement Algorithms Utilizing Two Beam Interference", Butts, Proceedings of SPIE, Volume 440, pgs. 130–134, a number of algorithms are described which are used in the analysis of OPD induced interference patterns.

The implementation of the Butts algorithm can be difficult. Butts' implementation employs many individual detectors, each of whose outputs must be sampled and all of whose outputs must be analyzed to determine where the maximum radiance exists. Sampling requires a clock cycle per detector, so the time required for the analysis is substantial, given the need for a large number of detectors to accurately detect the light and dark areas of the fringe pattern. Once each of these outputs is known, the system then requires considerable computing power to locate the region of interest in the interference pattern and perform the algorithm.

Accordingly, it is an object of this invention to provide an optical phase detection and control system wherein a control signal is generated in a fraction of the time required by the prior art.

It is a further object of this invention to provide an optical path difference control system which enables correction signals to be generated utilizing a simplified detection and logic system.

SUMMARY OF THE INVENTION

A system is described for determining the phase relationship between two laser beams and, if the beams are not in phase, providing a correction signal to bring them into phase. The system includes means for combining the beams to create an interference fringe pattern, the pattern exhibiting, if the beams are in phase, a central peak irradiance fringe bounded on either side by lesser peak irradiance fringes. The fringe pattern responds to a change in the relative phase of the beams by the fringes moving to the left or right under the stationary modulation envelope depending upon the direction of phase change between the beams. A pair of detectors are positioned to detect the lesser peak irradiance fringes (higher order fringes) but not the maximum peak irradiance fringe. The detector output signals are indicative of the power in each lesser peak irradiance fringe. A processor responsive to those signals provides a correction output when the signals indicate unequal powers.

A preferred embodiment OPD correction system is described and additionally includes a central fringe detector as well as detectors for the lesser peak irradiance fringes. The central fringe output signal is applied to the processor and, in combination with the lesser peak irradiance fringe signals, the processor uses those signals to derive a correction output.

DESCRIPTION OF THE DRAWINGS

FIG. 7 is a plot of potentials resulting from the output currents from the left, right and center photo sensors of FIG. 5.

FIG. 8 is a brief outline of an algorithm used by the processor of FIG. 7 to determine OPD correction voltages.

DETAILED DESCRIPTION OF THE INVENTION

Figure 1:
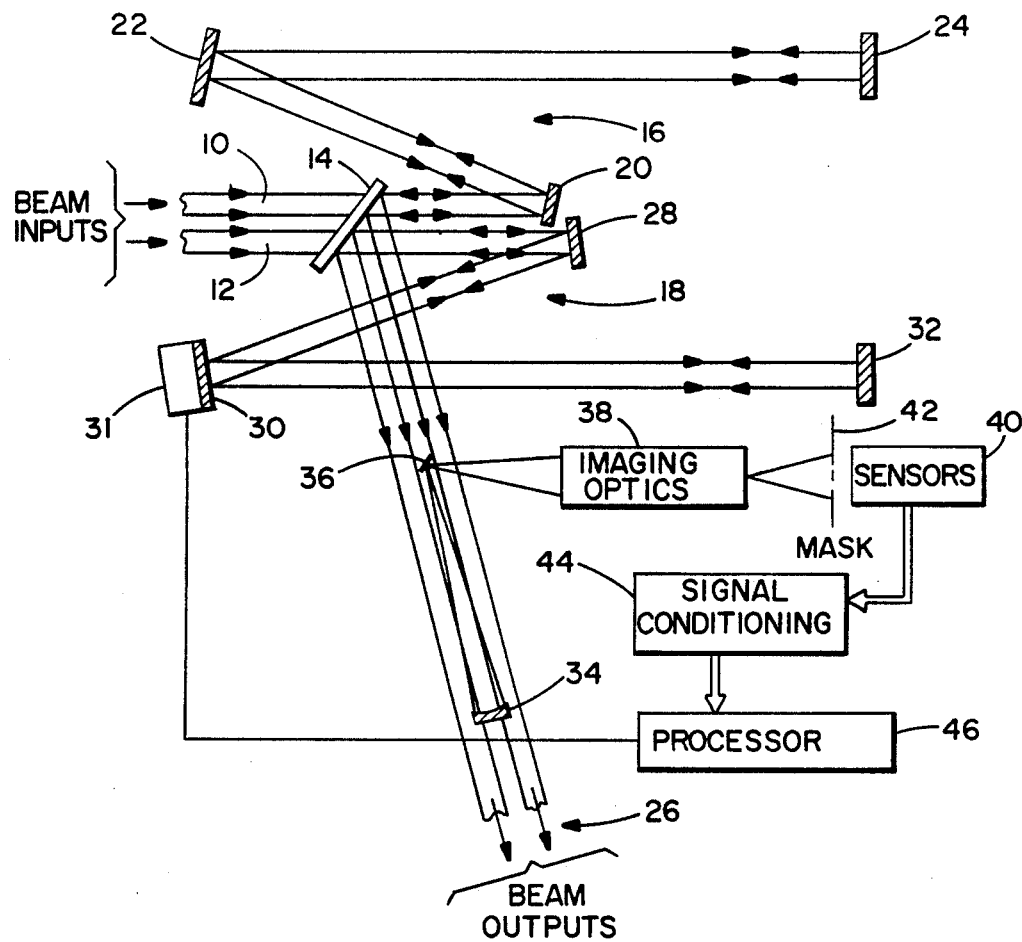
FIG. 1 is a schematic diagram of a system which embodies the invention.

Referring to FIG. 1, a pair of co-phased, coherent beams 10 and 12 are directed through a half silvered mirror 14 to two equal length optical paths 16 and 18. Beam 10 passes through mirror 14, and is reflected by mirrors 20, 22 and retroreflective mirror 24. After reflection by mirror 24, beam 10 retraces its path and is reflected downward by half silvered mirror 14 to beam output 26. In a similar manner, beam 12 passes through half silvered mirror 14, impinges on mirrors 28, 30 and 32 and eventually exits at beam output 26. While optical paths 16 and 18 are constructed as closely equal as possible, it is well known that temperature differences, vibration and other disturbances cause variations in OPD. In order to correct OPD, mirror 30 is backed by a piezo electric actuator 31 which may be "pistoned" to cause mirror 30 either to lengthen or decrease the optical path of beam 12.

In order to derive a correction signal for actuator 31, a mirror 34 samples portions of beams 10 and 12 and reflects both to surface 36. Since beams 10 and 12 are coherent, an interference pattern is created on surface 36 which is in turn imaged by imaging optics 38 and projected onto sensor 40 through mask 42. Sensor 40 is preferably a photo sensitive light sensing unit which has a plurality of individual sensors adapted to detect the light levels projected through the openings in mask 42. Mask 42 enables precise selection of the areas of the fringe pattern which are projected on the individual sensors.

Outputs indicative of the projected light levels are provided to signal conditioning circuit 44 whose outputs are, in turn, applied to processor 46. The functions and details of signal conditioning circuit 44 will be discussed in greater detail in the description of FIG. 3 and 6. Processor 46 analyzes those outputs from circuit 44 and provides a correction voltage to actuator 31 to modify the OPD in accordance with its analysis.

Figure 2A:
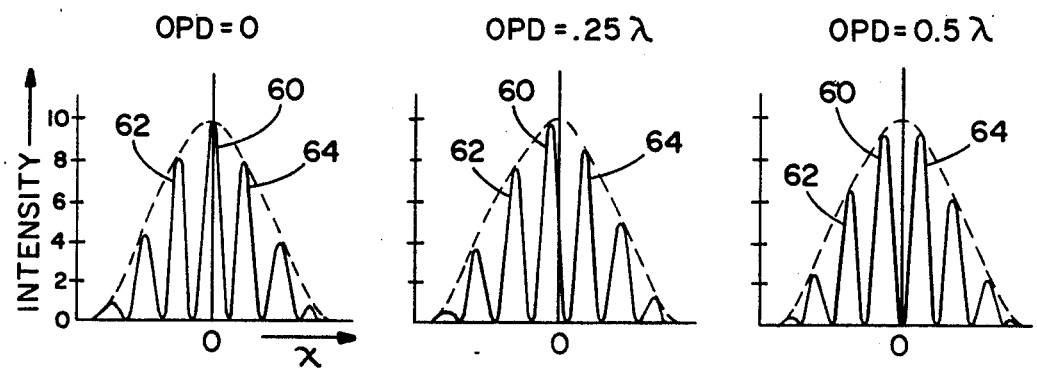
FIG. 2a depicts three interference patterns associated with three OPD conditions.
Figure 2:
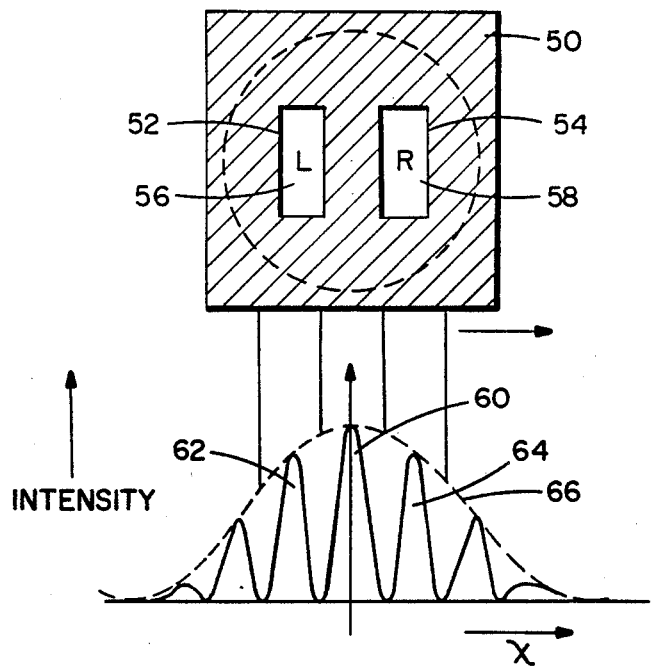
FIG. 2 is a plan view of left and right side fringe detectors including a showing of a zero OPD fringe pattern directed thereupon.

Referring to FIG. 2, additional details are shown of the OPD control system. Mask 50 has two openings 52 and 54 which expose left and right photo sensors 56 and 58. Also shown in FIG. 2 is an irradiance pattern of a set of interference fringes when there is zero OPD. Center fringe 60 exhibits the highest level of irradiance, whereas equidistantly spaced left side fringe 62 and right side fringe 64 are of equal but lesser irradiance. (When there is zero OPD, fringes 62 and 64 are of equal height under envelope 66.)

In FIG. 2a the relationship of fringes 60, 62 and 64 can be seen as OPD changes. Thus, from left to right, it can be seen that where OPD equals zero, the center irradiance fringe is well centered. As OPD increases to 0.25 wavelengths, the irradiance fringes 60, 62 and 64 begin to march to the left, with fringes 60 and 62 decreasing in irradiance while fringe 64 increases. When OPD equals 0.5 wavelengths, fringe 62 has decreased substantially in irradiance while fringes 60 and 64 are equal. An OPD occurring in the opposite direction causes a reverse movement of the fringe pattern.

Figure 3:
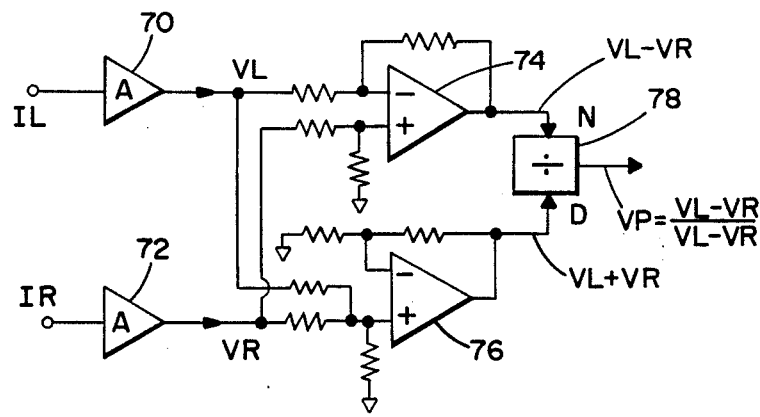
FIG. 3 is a logic circuit for determining OPD from a fringe pattern falling on the left and right side fringe detectors of FIG. 2.

Referring now to FIG. 3, the signal conditioning circuit employed with the sensors of FIG. 2 is illustrated. The current from left photo sensor 56 is applied through amplifier 70 which converts it to proportional voltage VL. Similarly, current from right photo sensor 58 is supplied to amplifier 72 which converts it to proportional voltage VR. VR and VL are then applied to the inputs to operational amplifier 74 whose voltage output is equal to the difference therebetween. VL and VR are also applied to operational amplifier 76 whose output is equal to the sum thereof. Both the sum and difference outputs are applied to analogue divider circuit 78 whose output is equal to the function:

$$VP = \frac{VL - VR}{VL + VR}$$

From an examination of the VP function as shown in the above equation, it can be seen that when the outputs of left and right photo sensors 56 and 58 are equal, VP equals 0. This indicates, of course, that OPD is 0. As the output from right photo sensor 58 begins to increase with respect to left photo sensor 56, VP decreases towards a negative value. On the other hand, if the output from left photo sensor 56 increases with respect to right photo sensor 58, VP increases in the positive direction.

Figure 4:
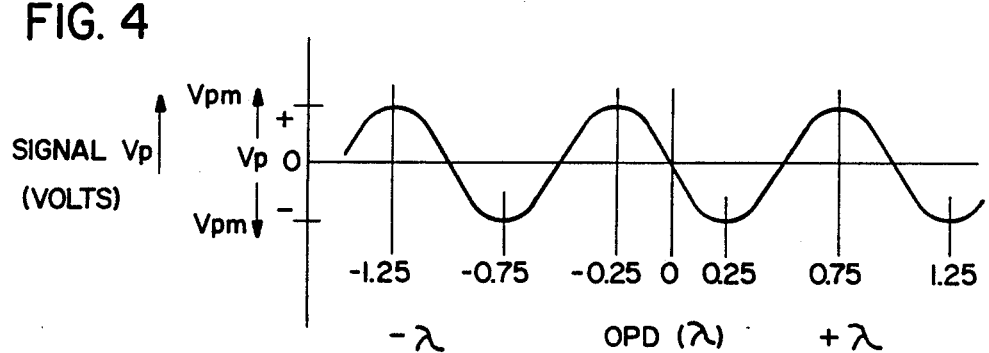
FIG. 4 is a plot of the output VP from the circuit of FIG. 3, as OPD changes.

As shown in FIG. 4, the variation of VP with OPD is a sinusoidal function and goes through 0 at 0 OPD. It is also seen to exhibit maximum values $\pm VPm$ a quarter wavelength on the either side of 0 OPD and at every half wavelength thereafter. This can also be determined from an inspection of FIG. 2a.

VP is fed to processor 46 (FIG. 1) which, in turn, produces an output correction voltage and applies it to actuator 31 to correct the OPD. It is observed, that VP forms a valid control signal for closed loop OPD correction so long as the disturbance is constrained to be less than $\pm 0.5$ wavelengths. The best control is obtained for disturbances smaller than 0.25 wavelengths.

Figure 5:
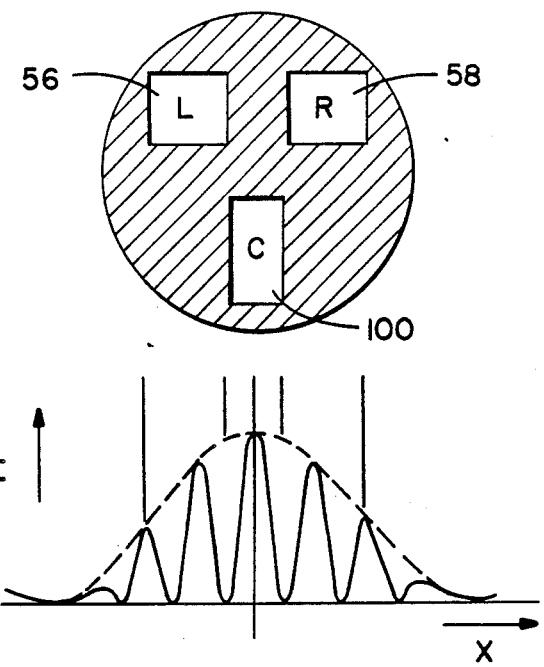
FIG. 5 is a preferred embodiment of the invention which enables precise phase control to be accomplished over a broader range than the configuration of FIG. 2.
Figure 6:
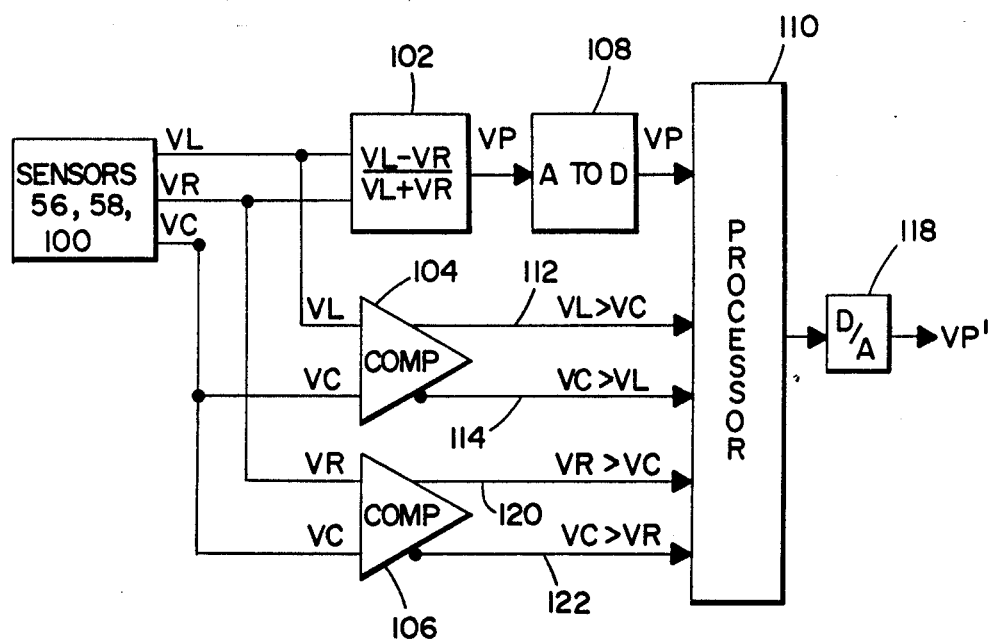
FIG. 6 is a block diagram of a circuit for providing an OPD correction signal in accordance with the outputs from the sensors of FIG. 5.

Referring now to FIG. 5, a preferred embodiment of the invention is shown which provides substantial additional OPD correction capability. A photo-sensor 100 has been added to the circuit and sees only the central region between right and left photo sensing elements 56 and 58. The outputs from sensors 56, 58 and 100 (i.e., VL, VR and VC) are applied, as shown in FIG. 6, to circuit 102 which is identical to that shown in FIG. 3 and to comparators 104 and 106. The output VP from circuit 102 is fed through A to D converter 108 and then to processor 110.

Each of comparators 104 and 106 provides an up level on one of its output lines only if one of its inputs is higher than the other. Thus, comparator 104 provides an up level on output line 112 if VL is greater than VC. The opposite output condition (i.e., an up potential on line 114 and a down potential on line 112) indicates that VC is greater than VL. The operation of comparator 106 is similar except that its inputs are VR and VC. Each of the aforementioned levels is sampled and analyzed in processor 110 and a correction voltage is created, converted to an analogue correction potential in D to A converter 118, and then transmitted to actuator 31 (FIG. 1) to modify the OPD.

The algorithm used by processor 110 to determine the sense of the correction voltage and its magnitude can better be understood by referring to FIGS. 7 and 8. In FIG. 7, VP, VR, VL and VC have been plotted to show their individual variation as well as the relationship of each to the other. Thus, it is noted that at 0 OPD, VR = VL and VC is at a maximum, indicating that central radiance fringe 60 is centered on photo sensor 100.

As OPD increases in one direction, VR begins to increase, VL and VC decrease. At 0.25 wavelengths, VP reverses itself in the opposite direction and again reverses every 0.5 wavelength thereafter. The VP output from circuit 102 follows the shape of VL and varies as the difference between VL and VR varies. From an examination of FIGS. 6 and 7, it can be seen that line 112 from comparator 104 goes high (VL>VC) at crossing point 130 in FIG. 7 and low at crossing point 132 (VC>VL). The exact reverse states occur on output line 114. In like manner, output line 120 from comparator 106 is low prior to crossing point 134 (VC>VR) and goes high until crossing point 136 where it reverts to its low state. The outputs on line 122 exhibit reverse states.

By sensing the aforementioned state reversals at crossing points 130, 132, 134 and 136, processor 110 is able to generate piston correction voltages which reverse the OPD changes. In order to carry out the algorithm, processor 110 continuously samples its inputs.

Within the region between −0.25 to +0.25 wavelengths, the correction voltage is VP. A comparator state change signals that VP is in the vicinity of a minimum or maximum value. At that time, the VP maximum or minimum value is stored as Vpm. The difference between Vpm and a subsequently sampled VP value is called Vdiff. During the next half wave, Vdiff is either added to or subtracted from the previously stored value to provide a piston correction voltage VP'.

The algorithm used by processor 110 to determine whether to add or subtract Vdiff is shown in FIG. 8. Initially assume at time t1, that line 120 from comparator 106 is in the up state (VR>VC). When at t2 the next time sample is taken, output line 112 is in its up condition indicating VL>VC. These succeeding conditions indicate that the fringe pattern moved to the right in the interval between t1 and t2. This is illustrated in FIG. 7 where at t1, the sampled levels indicate that the VC and VR levels are to the right of intersection 134 and VR>VC. At t2, the sampled levels indicate that the VC level has moved to the right of intersection 130 (VL>VC).

At that point, the stored value of Vpm is near its negative peak so the subsequent Vdiff voltage is negative and must be added to the output as the piston correction voltage. The remainder of the algorithm is implemented in conformance with the table of FIG. 8 and in accordance with the voltage states emanating from comparators 104 and 106.

The circuits of FIGS. 3 and 5 are very fast in their generation of piston correction voltages. The processor requires just one cycle to sample all sensor outputs and to commence logic operation. The voltage comparisons are simple, few and are rapidly accomplished.

It is to be understood that the above described embodiments of the invention are illustrative only and that modifications throughout may occur to those skilled in the art. For instance, while the examples used herein have involved two beam/apertures, the invention is applicable, by extension and in general, to multiple aperture applications. Accordingly, this invention is not to be regarded as limited to the embodiments disclosed herein, but is to be limited as defined by the appended claims.

What is claimed is:

1. A system for determining a phase relationship between two coherent beams, and when the beams are not in phase, providing a correction output to bring them into phase, said system comprising:
    means for combining said beams to create an interference fringe pattern, said pattern exhibiting, when said beams are in phase, a central peak irradiance fringe bounded on either side by lesser peak irradiance fringes, said fringe pattern responding to a change in relative phase of said beams, to move in one direction or the other depending upon a direction of phase change between said beams;
    first and second side fringe detection means positioned to detect said lesser peak irradiance fringes, but not said central peak irradiance fringe, and to provide signals indicative of power in said lesser peak irradiance fringes; and
    processor means for providing said correction output to bring said beams in phase when said signals indicate unequal power in said lesser peak irradiance fringes.

2. The invention as defined in claim 1 further comprising:
    optical path alteration means responsive to said correction output to modify the optical path experienced by at least one of said beams to reduce the relative phase difference between said beams.

3. The invention as defined in claim 2 wherein said first and second side fringe detection means comprise photo sensitive detectors on which said side fringes are imaged.

4. The invention as defined in claim 3 further including mask means superimposed upon said photosensitive detectors to restrict their ability to sense other than said lesser peak irradiance side fringes.

5. The invention as defined in claim 1 further comprising:
    center fringe detection means for detecting said central peak irradiance fringe and providing a central fringe output signal indicative of the power therein to said processor means, said processor means employing said signal in combination with said lesser peak irradiance fringe signals to derive said correction output.

6. The invention as defined in claim 5 further comprising:
    optical path alteration means responsive to said correction output to modify the optical path experienced by at least one of said beams to reduce the relative phase difference between said beams.

7. The invention as defined in claim 6 wherein said processor means includes means for sampling said central fringe output signal and said lesser peak irradiance fringe signals at two different times to determine the relative direction of movement of said phases, and upon such determination, producing said correction output to operate said optical path alteration means.

8. The invention as defined in claim 7 wherein said processor means comprises:
    first comparator means for producing indications when a central fringe signal (VC) is less than its left side fringe signal (VL) and when said central fringe signal (VC) is greater than its left side fringe signal (VL); and
    second comparator means for producing indications when said central fringe signal (VC) is less than its right side fringe signal (VR) and when said central fringe signal (VC) is greater than its right side fringe signal (VR).

9. The invention as defined in claim 8 wherein said processor means further comprises: circuit means for providing an output equal to $$VP = \frac{VL - VR}{VL + VR};$$

said processor means including means for producing a correction output based on the level of variable voltage (VP) in accordance with predetermined outputs from said first and second comparator means.

10. The invention as defined in claim 9 wherein said sample means samples the indications from said first and second comparator means and said circuit means, said processor means producing first correction outputs when said indications transition from VR>VC to VL>VC and VC>VR to VC>VL; and second correction outputs when said indications transition from VL>VC to VR>VC and VC>VL to VC>VR.

* * * * *